(12) United States Patent
Peterson et al.

(10) Patent No.: US 8,576,721 B1
(45) Date of Patent: *Nov. 5, 2013

(54) LOCAL FORWARDING BIAS IN A MULTI-CHASSIS ROUTER

(75) Inventors: Eric L. Peterson, Carlisle, MA (US); Satish Katpally, Arlington, MA (US); Steven Onishi, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,173

(22) Filed: Mar. 19, 2012

Related U.S. Application Data (63) Continuation of application No. 12/481,151, filed on Jun. 9, 2009, now Pat. No. 8,139,492.

(51) Int. Cl.
*H04L 12/26* (2006.01)
*G06F 15/173* (2006.01)

(52) U.S. Cl.
USPC ............ 370/238; 709/235; 709/241; 709/242

(58) Field of Classification Search
None
See application file for complete search history.

(56) References Cited

U.S. PATENT DOCUMENTS

| | | | |
|---|---|---|---|
| 6,532,212 B1 | 3/2003 | Soloway et al. | |
| 6,567,403 B1 | 5/2003 | Congdon et al. | |
| 7,184,437 B1* | 2/2007 | Cole et al. | 370/392 |
| 7,447,198 B1 | 11/2008 | Banks et al. | |
| 7,483,371 B2 | 1/2009 | Lingafelt et al. | |
| 7,519,057 B2 | 4/2009 | Lund et al. | |
| 7,552,262 B1 | 6/2009 | Turner et al. | |
| 7,593,324 B2 | 9/2009 | Jain et al. | |
| 7,861,247 B1 | 12/2010 | Santos et al. | |
| 7,865,536 B1 | 1/2011 | Ghemawat et al. | |
| 7,899,930 B1 | 3/2011 | Turner et al. | |
| 7,903,666 B1 | 3/2011 | Kumar et al. | |
| 8,139,492 B1* | 3/2012 | Peterson et al. | 370/238 |
| 2003/0099247 A1 | 5/2003 | Toutant et al. | |
| 2004/0257989 A1 | 12/2004 | Lingafelt et al. | |
| 2004/0257990 A1 | 12/2004 | Lingafelt et al. | |
| 2005/0060402 A1 | 3/2005 | Oyadomari et al. | |
| 2005/0094568 A1 | 5/2005 | Judd | |
| 2005/0105904 A1 | 5/2005 | Varanasi et al. | |
| 2005/0163115 A1* | 7/2005 | Dontu et al. | 370/389 |
| 2005/0228852 A1 | 10/2005 | Santos et al. | |
| 2006/0039384 A1 | 2/2006 | Dontu et al. | |
| 2006/0087963 A1* | 4/2006 | Jain et al. | 370/217 |
| 2007/0005968 A1* | 1/2007 | Lu et al. | 713/168 |
| 2007/0183313 A1 | 8/2007 | Narayanan et al. | |
| 2008/0044181 A1 | 2/2008 | Sindhu | |
| 2008/0181196 A1* | 7/2008 | Regan et al. | 370/351 |
| 2008/0181233 A1 | 7/2008 | Washam et al. | |

(Continued)

OTHER PUBLICATIONS

Rosen, "Multiprotocol Label Switching Architecture," Networking Group RFC 3031, Jan. 2001, 48 pp.

*Primary Examiner* — Timothy J Weidner
(74) *Attorney, Agent, or Firm* — Shumaker & Sieffert, P.A.

(57) ABSTRACT

Techniques are described for reducing the amount of data traffic carried on inter-chassis links within a multi-chassis router. A multi-chassis router is described in which the packet forwarding engines (PFEs) of each chassis receive and modify forwarding structures, generated in accordance with various load-balancing protocols, to exhibit a chassis-local link preference. Each of the PFEs may implement a selection bias for forwarding paths that egress from the multi-chassis router at the member chassis that includes the ingress PFE.

20 Claims, 5 Drawing Sheets

(56) References Cited

U.S. PATENT DOCUMENTS

| | | |
|---|---|---|
| 2010/0020680 A1 | 1/2010 | Salem et al. |
| 2010/0290475 A1 | 11/2010 | Belanger et al. |
| 2010/0293200 A1 | 11/2010 | Assarpour |
| 2010/0303083 A1 | 12/2010 | Belanger et al. |
| 2010/0309912 A1 | 12/2010 | Mehta et al. |
| 2012/0020246 A1* | 1/2012 | Hand et al. .................. 370/254 |

* cited by examiner

FIG. 5

LOCAL FORWARDING BIAS IN A MULTI-CHASSIS ROUTER

This application is a continuation of U.S. application Ser. No. 12/481,151, filed Jun. 9, 2009, which is incorporated herein by reference in its entirety.

TECHNICAL FIELD

The invention relates to computer networks, and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks, such as routers, often include a routing engine that provides control plane functionality for the network device. In some cases, the network devices may also include a plurality of packet forwarding engines (PFEs) and a switch fabric that collectively provide a forwarding plane for forwarding network traffic.

The routing engine provides control plane functions storing network topology in the form of routing tables, executing routing protocols to communicate with peer routing devices and maintain and update the routing tables, and providing a management interface to allow user access and configuration of the network device. The routing engine maintains routing information that describes a topology of a network, and derives a forwarding information structure, e.g., a forwarding information base (FIB), in accordance with the routing information. In general, the routing information represents the overall topology of the network and defines routes to destinations/prefixes within the network.

In contrast, the forwarding information is generated based on selection of certain routes within the network and maps packet key information (e.g., destination information and other select information from a packet header) to one or more specific next hops and ultimately to one or more specific output interfaces of interface cards of the network device. Typically, the routing engine installs forwarding structures into each of the PFEs to control forwarding of traffic within the data plane. This allows the FIB in each of PFEs to be updated without degrading packet forwarding performance of the routing node. In some instances, the routing engine may derive separate FIBs which are copied to respective PFEs.

One way to provide reliable system availability for the network is to use multi-chassis routers. A multi-chassis router is a router in which multiple routing nodes are physically coupled and configured to operate as a single routing node. To other routers on the network, the multi-chassis router appears as a single routing node. However, a multi-chassis router may have multiple links, allocated among the member chassis, to a neighbor router or other network device. Replicating resources for network links across the member chassis of a multi-chassis router gives rise to inter-chassis redundancy (ICR), which can protect against access link failures, uplink failures, and wholesale chassis failures without significant disruption to connected devices on the network.

In some multi-chassis configurations, the member chassis of a multi-chassis router are connected by inter-chassis links between associated interface cards of the member chassis. In many cases, the forwarding structures installed into the PFEs of the member chassis specify a forwarding path that includes an inter-chassis link. As a result, a packet that enters a multi-chassis router at one member chassis may be forwarded, via an inter-chassis link, to a different member chassis that includes the egress interface card for the packet.

SUMMARY

In general, the invention is directed to techniques for modifying the forwarding structures installed in packet forwarding engines (PFEs) to reduce the level of network traffic carried by inter-chassis links in a multi-chassis router. More specifically, techniques are described by which a PFE implements a selection bias for paths in a forwarding structure that specify an egress port located on the member chassis that contains the ingress PFE.

For example, in some configurations a multi-chassis router may comprise multiple member chassis that each has a separate network connection (i.e., physical link) to a particular neighboring router. In an Equal-Cost Multipath (ECMP) scheme, the master routing engine for the multi-chassis router typically derives a forwarding structure that permits the packet forwarding engine to balance the packet load for a path with equal-cost next hops. Because the path to the neighbor router is equally costly from each member chassis connected to the neighbor router, the forwarding structure includes egress ports in each member chassis as a next hop for the neighbor router destination. The master routing engine then pushes the forwarding structure to the various PFEs of the multi-chassis router. As a result, in conventional systems using ECMP, traffic received on one chassis of the multi-chassis router and destined for a neighbor to which multiple links exist may be balanced by forwarding the traffic in part over a first outbound link provided by the chassis that initially received the traffic and in part over a second outbound link provided by another chassis of the multi-chassis router. As a result, internal traffic flow over the router's internal inter-chassis link is increased and, in some cases, the bandwidth of the inter-chassis link becomes a bottleneck for efficient packet forwarding.

Using the techniques described herein, for paths in a forwarding structure that have two or more equal-cost next hops, a PFE for a member chassis analyzes the forwarding structures installed by the routing engine and, where possible, modifies the forwarding structures to provide forwarding biases for links provided by that member chassis. For example, where possible, the PFE removes next hops that specify interfaces located on a remote member chassis in favor of next hops for local interfaces of the member chassis that provide connectivity to the same neighbor. In this manner, the PFE exhibits a forwarding preference for chassis-local network connections.

In one embodiment, the invention is directed to a router comprising a plurality of routing chassis connected by one or more inter-chassis links and operating as a single node within a network. The router further comprises a packet forwarding engine on a first one of the routing chassis, wherein the packet forwarding engine is configured to implement a forwarding path preference for a network destination to reduce utilization of the inter-chassis links by network packets, and wherein the packet forwarding engine forwards network packets based on the forwarding path preference.

In another embodiment, the invention is directed to a method of modifying a forwarding entry for a network destination to implement a forwarding path preference to reduce utilization of one or more inter-chassis links in a multi-chassis router, wherein the forwarding entry specifies a plurality of egress interfaces on one or more of a plurality of routing chassis in the multi-chassis router, and wherein the plurality of routing chassis are connected by the inter-chassis links and operate as a single node within a network. The method further comprises receiving a packet destined for the network destination, and forwarding the packet based on the forwarding path preference.

In another embodiment, the invention is directed to a method for generating a link aggregation group that comprises a first egress interface on a first routing chassis of a multi-chassis router and a second egress interface of a second routing chassis of the multi-chassis router, wherein the first and second egress interfaces are coupled to physical communication links to which a common network destination can be reached, and wherein the first and second routing chassis are connected by an inter-chassis link and operate as a single routing node within a network. The method also comprises selecting, with a packet forwarding engine within a first routing chassis of the multi-chassis router, the first egress interface to implement a forwarding path preference to reduce utilization of the inter-chassis links. The method further comprises receiving, with the packet forwarding engine, a network packet destined for a network destination, and sending the network packet to the first egress interface based on the selection.

The techniques described herein may present several advantages. For instance, because most interfaces of a multi-chassis router are used for connections to other network devices, inter-chassis bandwidth is typically limited relative to bandwidth dedicated to receiving and transmitting network traffic. Implementing a forwarding preference for chassis-local network connections may reduce the number of forwarding paths that include an inter-chassis link, thereby also reducing the network traffic burden on the inter-chassis links and reserving inter-chassis bandwidth for failure conditions. In some instances, the techniques may permit a reduction in the amount of inter-chassis bandwidth required by the multi-chassis router. In such instances, interfaces and other resources that would otherwise be dedicated to transporting inter-chassis traffic may be reassigned so as to expand network connectivity and increase router utilization.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
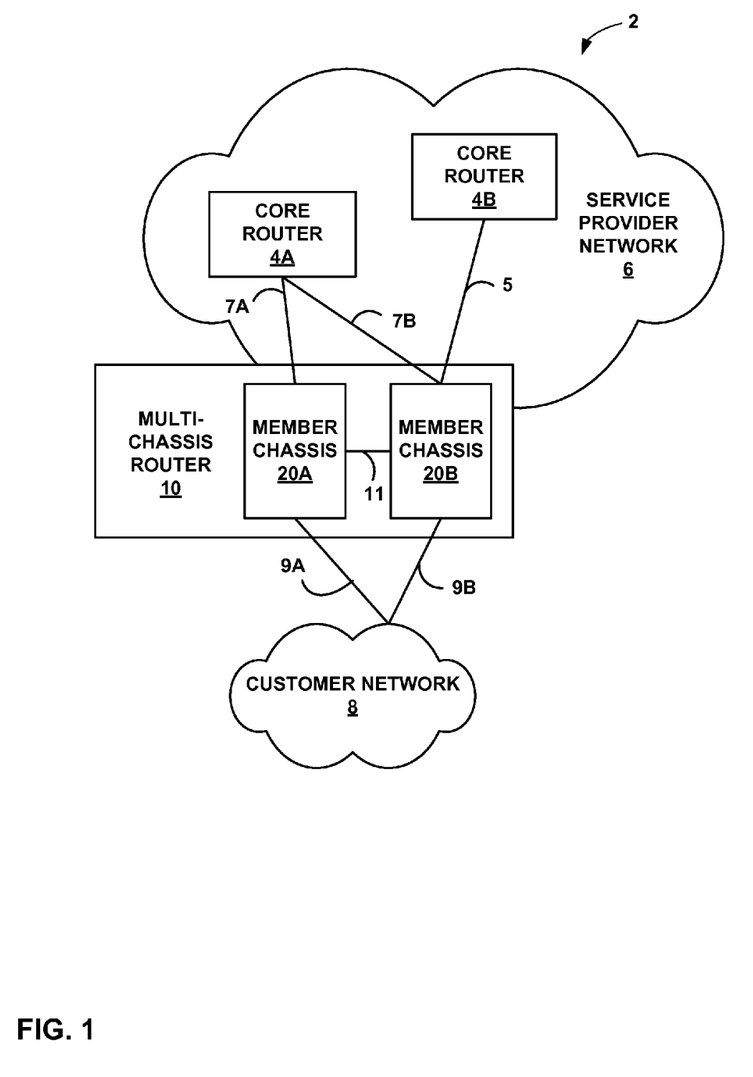
FIG. 1 is a block diagram illustrating an example system in which a multi-chassis router communicates data packets and exchanges routing information in a manner consistent with the principles of the invention.

FIG. 1 is a block diagram illustrating an example system 2 in which service provider network 6 includes a multi-chassis provider edge router 10 ("multi-chassis router 10") and core routers 4A-4B (collectively, "core routers 4"). For purposes of example, the principles of the invention are described with respect to system 2 of FIG. 1 in which core routers 4 communicate with multi-chassis router 10 to provide customer networks 8 with access to network 6. Multi-chassis router 10 may exchange network packets with customer network 8 to facilitate network communication. In the example of FIG. 1, multi-chassis router 10 includes member chassis 20A-20B (collectively, "member chassis 20") configured to operate as a single node within service provider network 6. Member chassis 20A-20B are coupled to core router 4A via communication links 7A-7B, respectively. In addition, member chassis 20B is coupled to core router 4B via communication link 5. In some embodiments, multi-chassis router 10 may include additional member chassis. Member chassis 20A is configured to operate as a master chassis and member chassis 20B is configured to operate as a line card chassis. Each of member chassis 20 may contain physical interfaces for coupling to other devices within service provider network 6 and to customer network 8. While each of member chassis 20 operate as packet routing devices, member chassis 20A, as master chassis, is responsible for managing the master routing information and propagating this master routing information to member chassis 20B in order for multi-chassis router 10 to properly forward data packets. Example embodiments of multi-chassis router 10 are described in U.S. Ser. No. 11/217,017, entitled "INTEGRATION OF AN OPERATIVE STANDALONE ROUTER INTO A MULTI-CHASSIS ROUTER," filed Aug. 31, 2005, and U.S. Ser. No. 11/832,342, entitled "MULTI-CHASSIS ROUTER WITH MULTIPLEXED OPTICAL INTERCONNECTS," filed Aug. 1, 2007, the contents of each of which are incorporated herein by reference.

Member chassis 20A and 20B are coupled via inter-chassis link 11. In general, the internal topology of multi-chassis router 10 is opaque to the other devices of system 2. That is, multi-chassis router 10 functions as a single node in service provider network 6, and internal communication, routing, and forwarding functions between member chassis 20 typically do not affect the network behavior of the other devices of system 2. In some embodiments, however, limited topology information may be exposed to core routers 4.

Although not illustrated, service provider network 6 may be coupled to one or more networks administered by other providers, and may thus form part of a large-scale public network infrastructure, e.g., the Internet. Consequently, customer network 8 may be viewed as an edge network of the Internet. Service provider network 6 may provide computing devices within customer networks 8 with access to the Internet. Service provider network 6 may include a variety of network devices other than multi-chassis router 10 and core routers 4, such as additional routers, switches, servers, or other devices.

In some embodiments, service provider network 6 may be a label switching network in which network devices, often referred to as Label Switching Routers or LSRs, use Multi-Protocol Label Switching (MPLS) signaling protocols to establish Label Switched Paths (LSPs). The MPLS data-carrying mechanism of service provider network 6 may be viewed as lying between layer 2 and layer 3 of the Open Systems Interconnection (OSI) model and is often referred to as a layer 2.5 protocol. Further information regarding MPLS and the various features of MPLS, as well as, general architectural information regarding MPLS can be found in Request for Comments (RFC) 3031, titled "Mutiprotocol Label Switching Architecture," prepared by the Network Working Group of the Internet Engineering Task Force (IETF), dated January 2001, herein incorporated by reference.

In the illustrated embodiment, member chassis 20A-20B of multi-chassis router 10 are coupled to customer network 8 via access links 9A-9B (collectively, "access links 9"), respectively. Customer network 8 may include one or more customer edge routers (not shown). Customer network 8 may further include one or more computing devices (not shown), such as personal computers, laptop computers, handheld computers, workstations, servers, switches, printers, or other devices. The configuration of computing environment 2 illustrated in FIG. 1 is merely exemplary. For example, service provider network 6 may be coupled to additional customer networks. Nonetheless, for ease of description, only customer network 8 is illustrated in FIG. 1.

In exemplary system 2, customer network 8 is equally reachable by member chassis 20A and 20B of multi-chassis router 10. That is, with respect to the forwarding structures initially generated by master chassis 20A, a packet received by member chassis 20A has a next hop from member chassis 20A to customer network 8 that is of equal cost to a next hop from member chassis 20B to customer network 8. Similarly, a packet received by member chassis 20B has equal-cost next hops to customer network 8 from both member chassis 20A and 20B.

Multi-chassis router 10 may employ equal-cost multipath routing (ECMP) to increase the bandwidth between multi-chassis router and customer network 8 by balancing the traffic load between access links 9A and 9B. Equal-cost multipath routing is an OSI layer 3 mechanism for performing load balancing for a path with multiple equal-cost next-hops. In accordance with ECMP techniques, the master routing engine (not shown in FIG. 1) for multi-chassis router 10 discovers, using a routing protocol such as OSPF, RIP, or BGP, multiple equal-cost routes to the same destination. The master routing engine (member chassis 20A in this example) installs these multiple equal-cost routes into the device routing information base. The master routing engine then derives one or more forwarding structures from the routing information base. The derived forwarding structure maintains the multiple equal-cost routes in the form of multiple possible next-hops to the same destination. In conventional router implementations, the master routing engine installs these forwarding structures in the forwarding plane of the router, and the forwarding plane uses both next-hops for the destination according to a load-balancing strategy.

In accordance with the principles of the invention, the forwarding planes of member chassis 20 modify the forwarding structure received from the master routing engine of multi-chassis router 10 in order to implement a forwarding preference for the chassis-local one of access links 9. For example, and as described in detail below, member chassis 20A may receive, from the master routing engine, a forwarding structure with a destination entry for a network device in customer network 8 that has two equal-cost next-hops (corresponding to access links 9A and 9B). Member chassis 20A removes the next-hop for access link 9B, leaving only the next-hop for access link 9A in the forwarding structure. Consequently, when member chassis 20A receives a packet having customer network 8 as the packet destination, member chassis 20A transmits the packet via access link 9A. In this manner, member chassis 20A avoids establishing a forwarding path through inter-chassis link 11 in order to transmit packets to customer network 8 via access link 9B; this reduces the network traffic load on inter-chassis link 11.

Alternatively, or in addition to employing ECMP, multi-chassis router 10 may employ link aggregation techniques to increase the bandwidth and communication reliability between multi-chassis router and customer network 8 by using both access links 9A and 9B. Access links 9A and 9B may communicate data according to a data link layer protocol such as Ethernet, Gigabit Ethernet, Asynchronous Transfer Mode (ATM), High-Level Data Link Control (HDLC), Point-to-Point Protocol (PPP), and the like. Although access links 9 are equal-cost next-hops from multi-chassis router 10 to customer network 8, link aggregation techniques do not necessarily require that the component communication links be of equal cost. However, aggregated links generally must operate at identical data rates.

Using the Link Aggregation Control Protocol (LACP) or other link aggregation method, multi-chassis router 10 combines the interfaces for access links 9 into a single logical interface, known as a link aggregation group. In a conventional multi-chassis router, when a packet arrives at the forwarding plane of a member chassis and there is a link aggregation group comprising constituent egress interfaces for a plurality of communication links to the packet destination, the forwarding plane of the member chassis may select, according to a load-balancing strategy, any of the constituent egress interfaces to transmit the packet to the destination.

Consistent with the principles of the invention, the forwarding planes of member chassis 20 modify a layer 2 forwarding structure in order to implement a layer 2 forwarding preference for the chassis-local one of access links 9. For example, and as described in detail below, member chassis 20A may determine that customer network has two access links (access links 9A and 9B) to multi-chassis router 10. Member chassis 20A, in order to increase the bandwidth of the data link connection between customer network 8 and multi-chassis router 10, may logically combine the interfaces for access links 9 into a single link aggregation group and install the link aggregation group into the layer 2 forwarding structure so that links 9 may be viewed as a single link with respect to routing decisions. As a result, packets forwarded to the aggregate link may in conventional systems be balanced by the forwarding planes across physical links 9A and 9B. In such cases, because the access link 9B interface resides on member chassis 20B, conventional link aggregation would also result in an increase in data traffic traversing inter-chassis link 11, reducing the bandwidth of inter-chassis link 11 for high priority internal control traffic of between member chassis 20 of multi-chassis router 10. However, in accordance with the principles of the invention, the PFE of member chassis 20A subsequently determines that the interface for access link 9A, unlike the interface for access link 9B, is local to member chassis 20A. The PFE of member chassis 20A therefore analyzes the local forwarding structures initially generated by the routing protocols and programmed into the PFE of member chassis 20A and removes the interface for access link 9B from the link aggregation group. As a result, data traffic received by member chassis 20A and having customer network 8 as a destination is sent to the interface for access link 9A, reducing the network traffic load on inter-chassis communication link 11.

Figure 2:
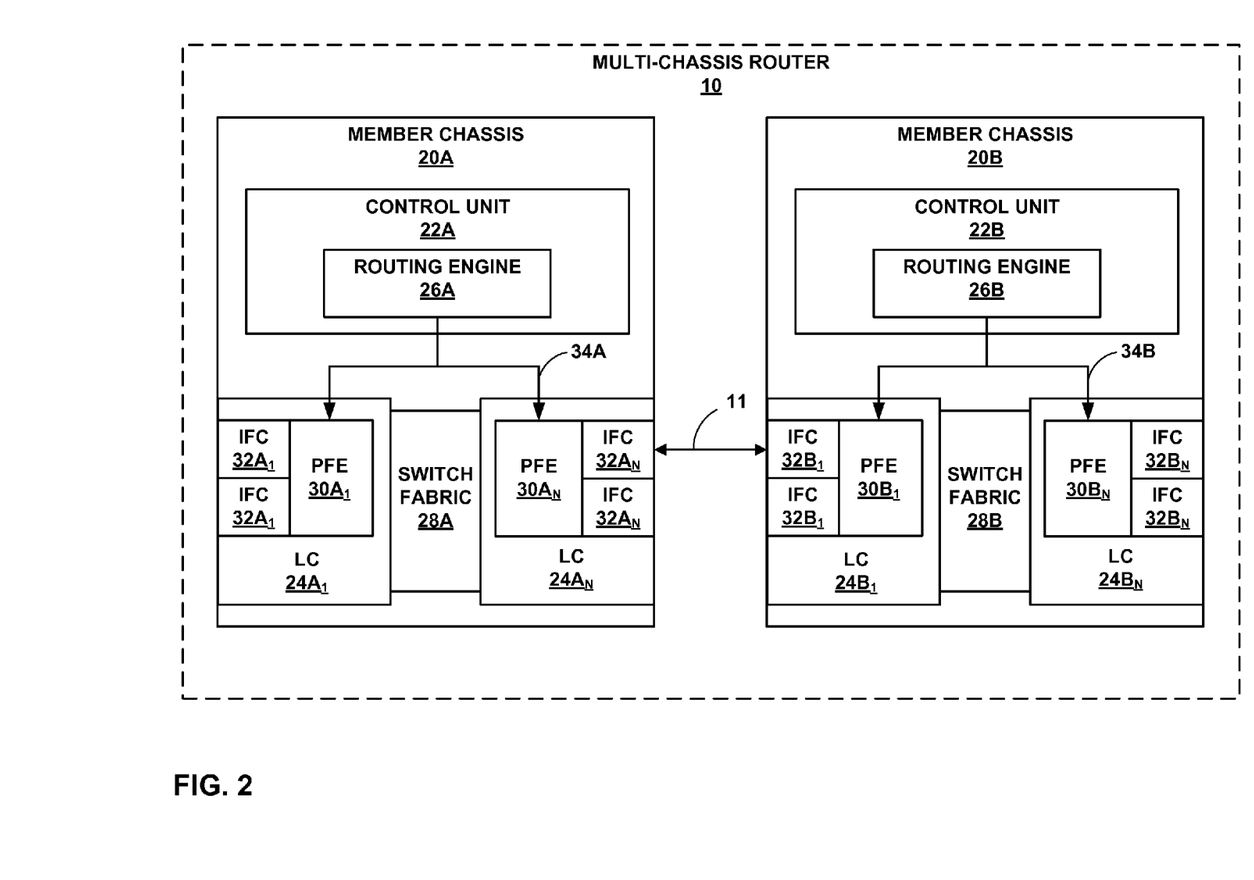
FIG. 2 is a block diagram illustrating an exemplary embodiment of a multi-chassis router having component chassis that implement a forwarding preference for chassis-local network connections in a manner consistent with the principles of the invention.

FIG. 2 is a block diagram illustrating the exemplary multi-chassis router 10 of FIG. 1 in further detail. Multi-chassis router 10 routes data packets between the network devices of system 2 of FIG. 1 and includes a plurality of member chassis operating as a single node within a network. In this example, multi-chassis router 10 comprises two similar member chassis 20 connected by inter-chassis communication link 11. In other embodiments, multi-chassis router 10 may include additional member chassis arranged in varying topologies, such as star, ring, full or partial mesh, tree, or line, and connected by multiple inter-chassis communication links.

Each of member chassis 20 includes a control unit 22 that manages the chassis processes. Control unit 22 includes routing engine 26, which maintains routing information describing the topology of the network and reachability of other network devices. In some embodiments, control unit 22 may include additional, backup routing engines in order to provide failover support. One of member chassis 20 is selected through election, configuration, or other method as the master chassis for multi-chassis router 10. In the example of FIG. 2, member chassis 20A is the master chassis. Accordingly, routing engine 26A of member chassis 20A is the master routing engine for multi-chassis router 10. Routing engine 26A, as master routing engine, performs all of the processing for multi-chassis router 10 that a routing engine in a single chassis router would perform. For example, routing engine 26A runs various interior routing protocols such as the Routing Information Protocol (RIP) or Open Shortest Path First (OSPF) to maintain an accurate description of the topology of service provider network 6. In addition, routing engine 26A runs exterior routing protocols such as the Border Gateway Protocol (BGP) to exchange routing information between service provider network 6 and customer network 8. The routing information may include route data that describes various routes through the network as well as next hop data indicating appropriate neighboring devices within the network for each of the routes.

Each member chassis 20 further includes one or more line cards 24 ("LC 24A-B"). A line card 24 may be, for instance, a dense port concentrator (DPC) and includes one or more packet forwarding engine 30 ("PFEs 30") and one or more physical interfaces such as interface cards 32 ("IFCs 32"). Switches 28 provide an interconnect path between line cards 24 and thus IFCs 32 of a member chassis 20. Switches 28 may comprise, for example, switch fabric, switchgear, a configurable network switch or hub, or other high-speed switching mechanisms. IFCs 32 may be coupled to network links via a number of physical interface ports (not shown).

In the example of FIG. 2, inter-chassis link 11 couples IFCs $32A_N$ and $32B_1$ of member chassis 20A and 20B, respectively, to provide a physical communication link between member chassis 20. Inter-chassis link 11 may comprise optical links or other point-to-point connection type. For some embodiments, inter-chassis link 11 may comprise a plurality of connections between one or more IFCs 32 of member chassis 20 to increase the bandwidth and reliability of communication between member chassis 20.

In some embodiments, PFEs 30 perform both layer 2 and layer 3 functions including switching, route lookup, and packet forwarding for member chassis 20. In some embodiments, PFEs 30 may perform forwarding functions for MPLS. Routing engine 26A uses the routing information to derive one or more forwarding structures (not shown) that associate next hop interfaces (i.e., egress interfaces of router 10 coupled to physical communication links) with particular network destinations and, more specifically, next hops (neighbor devices) for reaching those destinations. Routing engine 26A then installs these forwarding structures into the PFEs 30 of all member chassis 20 of multi-chassis router 10 via intra-chassis links 34 and inter-chassis link 11. In some embodiments, routing engines 26 of member chassis 20 may cooperate to derive and install the forwarding structures for PFEs 30. For example, in some instances, routing engine 26B receives one or more forwarding structures from routing engine 26A and installs the forwarding structures into PFEs 30B of member chassis 20B. A forwarding structure for one of PFEs 30 may be the same or different than a forwarding structure for other PFEs 30. A PFE 30 determines a next hop for each inbound packet based on its forwarding structure, identifies the corresponding one of IFCs 32 associated with the next hop, and relays the packets to the appropriate one of IFCs 32 via switches 28, inter-chassis link 11, and additional PFEs 30. Example forwarding structures storing next hop data are described in U.S. Pat. No. 7,184,437, entitled "Scalable Route Resolution," the entire content of which is incorporated herein by reference. Although described with respect to forwarding functions associated with layers 2 and 3 of the OSI model, the techniques can be applied to forwarding functions applied at other layers, such as layer 2.5 (MPLS) as well as layer 7 forwarding functions that are applied based on inspection of application-layer data carried by the packets.

Each member chassis 20 has a chassis identifier ("chassis ID") that uniquely identifies the member chassis to its peer member chassis. For example, member chassis 20B may have a chassis ID of 2. Each member chassis 20 populates its component PFEs 30 with the chassis ID of the member chassis 20.

Multi-chassis router 10 and, in particular, member chassis 20 include hardware, firmware and or software, and may include discrete hardware circuitry such as application-specific integrated circuits (ASICs), as well as processors, control units, or other logic for executing instructions fetched from computer-readable media. Examples of such media include hard disks, Flash memory, random access memory (RAM), read-only memory (ROM), non-volatile random access memory (NVRAM), electrically erasable programmable read-only memory (EEPROM), flash memory, and the like. A member chassis 20 may distribute all or a portion of the forwarding processing logic to PFEs 30.

Routing engine 26A, as master routing engine, may perform ECMP techniques to balance the network traffic load on member chassis 20A and 20B, which may, from the perspective of multi-chassis router 10, have equal-cost paths to a particular network destination. For this destination, routing engine 26A uses its routing information to derive a forwarding structure entry indexed by the destination and including, as next hop options, an interface on both member chassis 20A and 20B. Routing engine 26A then downloads the forwarding structure entry, either individually or as part of a list of such entries, to one or more of PFEs 30. A receiving one of PFEs 30 analyzes the forwarding structure entry to determine whether it maps a next hop to multiple next hop interfaces (i.e., egress interfaces) located on different chassis and, if so, whether one or more of the egress interfaces are on the same member chassis as the receiving PFE. For example, PFE $30A_1$ of member chassis 20A receives a forwarding structure entry for a particular destination from routing engine 26A that includes equal-cost egress interfaces, $I_A$ and $I_B$, on member chassis 20A and 20B, respectively. PFE $30A_1$ may compare its known chassis ID to the egress interfaces to determine that interface $I_A$ is present on member chassis 20A, while interface $I_B$ is on member chassis 20B. Accordingly, PFE $30A_1$ modifies the forwarding structure entry to remove any reference (e.g., index or pointer) to interface $I_B$ from the forwarding structure entry before installing the entry into its forwarding database, thereby dynamically implementing a preference for the chassis-local next hop interface. In some embodiments, PFE 30 retains within the modified forwarding structure entry the references to interfaces that are not chassis-local but alters the conventional load-balancing strategy in order to weight the preference for the chassis-local interfaces more heavily. In operation, PFEs 30 in such embodiments prefer any chassis-local interfaces but may resort to one or more remote interfaces when the local interfaces become sufficiently congested or exhibit other undesirable properties.

In some embodiments of multi-chassis router 10, such as a multi-chassis router that has a more complex member chassis topology, a PFE 30 may implement a "shortest path" bias, in that a PFE 30 exhibits a forwarding preference for egress interfaces that are not necessarily chassis-local but nevertheless minimize the utilization of inter-chassis links by network traffic. That is, in such embodiments, the preferred one or more next hop interfaces may be present on a remote member chassis, rather than the member chassis shared by the PFE, when there is no chassis-local interface for the particular network destination. A PFE 30 may additionally implement varying preference levels for multiple interfaces in a forwarding structure entry.

In some embodiments of multi-chassis router 10, PFE 30A$_1$ may receive a forwarding structure entry that includes a plurality of equal-cost egress interfaces on member chassis 20A. In these embodiments, PFE 30A$_1$ may, after modifying the forwarding structure entry according to the techniques described above, use a conventional load balancing strategy for forwarding packets using the plurality of member chassis 20A egress interfaces. Correspondingly, in embodiments of PFEs 30 that implement a shortest path bias, the preferred one or more egress interfaces may be present on a remote member chassis.

By implementing a chassis-local forwarding bias in accordance with the inventive techniques described above, PFEs 30 may avoid establishing a forwarding path through inter-chassis link 11 for network destinations that have equal-cost next hops to member chassis 20A and 20B. As a result, PFEs 30 reduce the network traffic load on inter-chassis link 11.

Alternatively, or in addition to implementing the layer 3 chassis-local forwarding bias described above, PFEs 30 may use LACP to combine one or more IFCs 32 into a single link aggregation group. A link aggregation group may include one or more IFCs 32 in both member chassis 20A and 20B. PFEs 30 implement a layer 2 forwarding preference for chassis-local IFCs 32 in a manner consistent with the principles of the invention. In some embodiments, when creating a link aggregation group, a PFE 30 may exclude any IFCs 32 that are not present on the member chassis 20 shared by that PFE. In other embodiments, a PFE 30 may receive a link aggregation group from another component of a member chassis 20, such as routing engine 26 or a line card 24. The PFE 30 may, based on its chassis ID, determine that one or more constituent IFCs for the received link aggregation group are on a remote chassis. For example, PFE 30A$_1$ may receive a link aggregation group having as members IFCs 32A$_1$ and 32B$_1$. PFE 30A$_1$ may remove the IFC 32B$_1$ from the link aggregation group because it is on a remote member chassis. Alternatively, PFE 30A$_1$ may ignore or underweight IFC 32B$_1$ when forwarding layer 2 traffic.

In further embodiments, a PFE 30 may retain one or more remote IFCs 32 in a link aggregation group but alter the conventional load balancing strategy to implement a weighted preference for one or more local IFCs 32. In still further embodiments of multi-chassis router 10, such as a multi-chassis router that has more complex member chassis topologies, PFEs 30 may implement a "shortest path" bias, in that a PFE 30 exhibits a layer 2 forwarding preference for IFCs 32 that are not chassis-local but nevertheless minimizes the utilization of the various inter-chassis links by layer 2 traffic. The distance from any one of member chassis 20 to another is measured by the inter-chassis routing path cost, which may account for latency, available bandwidth, the number of internal next hops through the multi-chassis router, and the like. In such embodiments, the preferred one of IFCs 32 may be present on a remote member chassis when there is no chassis-local one of IFCs 32 that has a layer 2 forwarding path to the particular network destination. A PFE 30 may additionally implement varying preference levels for multiple IFCs 32 in a link aggregation group.

By implementing a chassis-local layer 2 forwarding bias in accordance with these inventive techniques, PFEs 30 may avoid establishing a layer 2 forwarding path through inter-chassis link 11 and thereby reduce the layer 2 traffic (e.g., Ethernet packets) on inter-chassis link 11.

Figure 3:
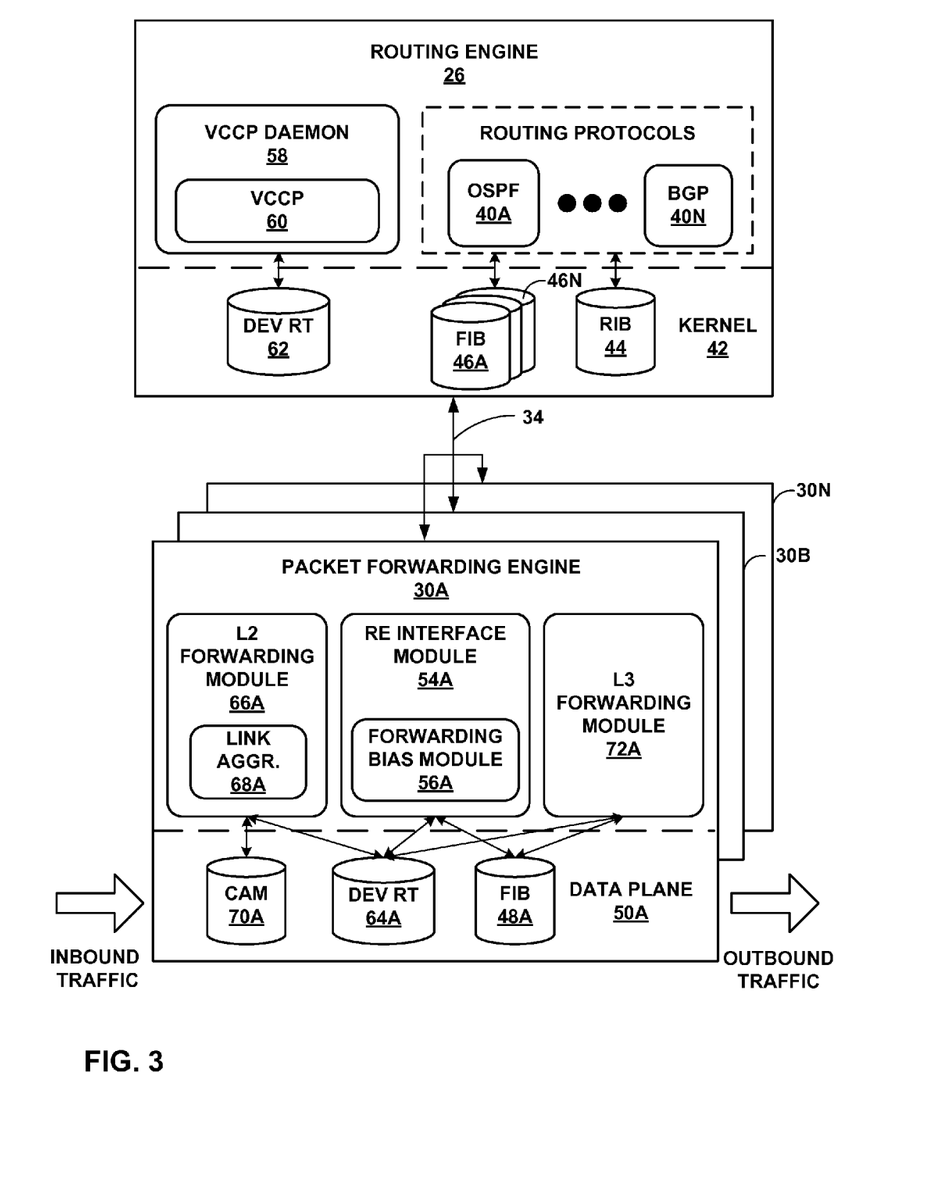
FIG. 3 is a block diagram illustrating a routing engine and packet forwarding engines of a member chassis of the multi-chassis router of FIG. 2 in further detail.

FIG. 3 is a block diagram that illustrates the routing engine 26 and packet forwarding engines 30 of an exemplary member chassis 20 of multi-chassis router 10 that implements a forwarding bias consistent with the principles of the invention. In this example, routing engine 26 provides an operating environment that includes kernel space 42. Kernel space 42 may include an operating system that provides a multi-tasking operating environment for execution of a number of concurrent processes. Routing engine 26 executes various routing protocols 40 that implement specific exterior and interior routing protocols, such as OSPF 40A, BGP 40N, and other protocols not shown. Routing engine 26 uses routing information obtained by executing routing protocols 40 to update routing information base 44 ("RIB 44"). RIB 44 contains route data that describes various routes through the network of multi-chassis router 10 that are mapped to next hop data indicating appropriate neighboring devices within the network for each of the routes. Routing engine 26 populates forwarding information bases 46A-46N (collectively, "FIBs 46") with forwarding data derived from route data in RIB 44. Generally, routing engine 26 maintains one of FIBs 46 for each of PFEs 30. RIB 44 and FIBs 46 may maintain route and forwarding data in the form of one or more tables, databases, linked lists, radix trees, databases, flat files, or any other data structure.

Routing engine 26 further includes virtual chassis control protocol daemon 58 ("VCCP daemon 58"), which executes virtual chassis control protocol 60 ("VCCP 60"). VCCP daemon 58 uses VCCP 60 primarily as a routing protocol and exchanges link state information with peer member chassis in order to construct or modify a member chassis topology for multi-chassis router 10. In some embodiments, VCCP daemon 58 also exchanges voting information among member chassis in order to elect a master member chassis for multi-chassis router 10. After constructing or modifying a topology, VCCP daemon 58 runs shortest path first (SPF) or another algorithm to generate device route table 62 (illustrated as "Dev RT 62"). Generally, device route table 62 has, for each peer member chassis in multi-chassis router 10, an entry that specifies the appropriate next hop (i.e., interface) on which to send packets to the peer member chassis. In some embodiments, device route table 62 also includes information that specifies the chassis ID for member chassis 20.

Routing engine 26 is communicatively coupled to PFEs 30A-30N via communication links 34. Communication links 34 may be a shared bus, dedicated cables or lines, a backplane, or other connection. In the example of FIG. 3, PFEs 30 are substantially similar, though for simplicity PFE 30A is shown in greater detail that PFEs 30B-30N.

PFE 30A performs layer 2 and layer 3 functions such as switching, route lookup, and packet forwarding for member chassis 20, where layers 2 and 3 refer to the data link and network layers of the Open Standards Interconnection (OSI) model, respectively. PFE 30A includes device route table 64A, FIB 48A, and CAM 70A, as well as data plane 50A, which typically consists of packet forwarding components that manage low-level packet operations for PFE 30A. Routing engine interface module 54A ("RE interface module 54A") accepts forwarding and other configuration information from routing engine 26 and delivers routing queries from the PFE 30A. Routing engine 26 downloads device route table 62, in whole or in part, to device route table 64A via RE interface module 54A. In some embodiments, device route table 64A receives the chassis ID for member chassis 20 from routing engine 26. In this example, member chassis 20 has chassis ID=C1. Routing engine 26 additionally installs the FIB for PFE 30A, FIB 46A into FIB 48A via RE interface module 54A.

Layer 3 forwarding module 72A (illustrated as "L3 forwarding module 72A") directs network traffic from PFE 30A to an interface card in multi-chassis router 10 based on forwarding entries in FIB 48A. Frequently, the specified interface card for network traffic resides on a peer member chassis. In such instances, L3 forwarding module 72A sends the network traffic to the peer member chassis based on the path specified in device route table 64A.

Similarly, layer 2 forwarding module 66A (illustrated as "L2 forwarding module 66A") directs data link layer traffic from PFE 30A to a packet forwarding engine in multi-chassis router 10 based on forwarding entries in content addressable memory 70A ("CAM 70A"), a layer 2 forwarding table that may maintain bridge forwarding data in the form of one or more tables, databases, linked lists, databases, flat files, or any other data structure. For example, CAM 70A may contain a table that maps interface cards in multi-chassis router 10 to the MAC addresses of various destination devices. CAM 70A is illustrated as content addressable memory, but may be another type of computer-readable media such as flash memory, random access memory (RAM), and the like. As with layer 3 traffic, the specified interface card for layer 2 traffic often resides on a peer member chassis. In such instances, L2 forwarding module sends the network traffic to the peer member chassis based on the path specified in device route table 64A.

PFE 30A cooperates with routing engine 26 to implement a chassis-local forwarding preference for either or both of the ECMP and link aggregation methods described above.

Routing engine 26 may, using ECMP techniques and based on route data in RIB 44, derive a FIB entry that includes a plurality of next-hop interfaces for a particular network destination. In some embodiments, routing engine 26 is not the master routing engine and therefore receives the FIB entry from the master routing engine in a peer member chassis.

In many instances, one or more of the next-hop interfaces will reside on one or more peer member chassis of multi-chassis router 10, rather than on member chassis 20 that includes routing engine 26. For example, the FIB entry may contain the following information:

$$\left\{ D_1 \rightarrow \begin{array}{l} FNH_1 \rightarrow \{C1::LC1::IFC8\} \\ FNH_2 \rightarrow \{C2::LC1::IFC5\} \end{array} \right.$$

In this example, for destination $D_1$ there are two equal-cost forwarding next hops, $FNH_1$ and $FNH_2$, that reference interface cards on different member chassis having chassis IDs of C1 and C2, respectively. That is, $FNH_1$ references IFC8 that is, in this example, a component of a line card in the first slot, LC1, of the member chassis having a chassis ID of C1. After installing the FIB entry into FIB 46A, routing engine 26 downloads the FIB entry to PFE 30A via RE interface module 54A. Consistent with the principles of the invention, forwarding bias module 56A determines that $FNH_2$ is a reference to a remote chassis (having chassis ID=C2). Similarly, the forwarding bias module 56A determines that $FNH_1$ references an interface card on member chassis 20 that includes PFE 30A. Forwarding bias module 56A implements the chassis-local forwarding preference by removing $FNH_2$ from the FIB entry, leaving only $FNH_1$ in this example. In some embodiments, forwarding bias module 56A may add configuration data, in the form of a flag or some other indicator, to the FIB entry that indicates, to L3 forwarding module 72A, that $FNH_1$ is the preferred forwarding next hop. The various forwarding next hops may also be ranked in order of preference. RE interface module 54A then installs the modified FIB entry into FIB 46A. For network packets received by PFE 30A and having destination $D_1$, L3 forwarding module 72A looks up the forwarding next hop in FIB 48A and switches the packet to the remaining specified interface card (i.e., IFC8). In this manner, PFE 30A reduces the amount of data traffic on the inter-chassis links of multi-chassis router 10 as compared to conventional ECMP techniques.

In some embodiments, the FIB entry may contain forwarding next hop information in a different format. For example, the master routing engine for multi-chassis router may consider all line cards or interface cards in the router as members of a single chassis and may index them contiguously (e.g., interface cards I0-I11 reside on a first member chassis, while interface cards I12-I23 reside on a second member chassis). RE interface module 54A in this instance may determine whether a forwarding next hop references an interface card on member chassis 20 that includes PFE 30A by calculating the chassis ID corresponding to the referenced interface card based on the index number for the interface card in the FIB entry.

L2 forwarding module 66A may use link aggregator 68A to consolidate a plurality of interfaces into a link aggregation group. Link aggregator 68A, for example, may determine that a plurality of interfaces in multi-chassis router 10 are alternative next-hops for a particular network destination and create an aggregated interface containing the following information:

$$\left\{ D_1 \rightarrow AI_1 \rightarrow \begin{array}{l} FNH_1 \rightarrow \{C1::LC1::IFC8\} \\ FNH_2 \rightarrow \{C2::LC1::IFC5\} \end{array} \right.$$

In this example, for destination $D_1$ there are two available forwarding next hops, $FNH_1$ and $FNH_2$, in CAM 70A that reference interface cards on line cards of different member chassis having chassis IDs of C1 and C2, respectively. Link aggregator 68A has aggregated the interfaces for these forwarding next hops into aggregated interface $AI_1$. PFE 30A may send the aggregated interface information to routing engine 26, via RE interface module 54A, as link state information that routing engine 26 may use in one of routing protocols 40 (e.g., OSPF 40A).

When PFE 30A receives or generates a layer 2 packet having $D_1$ as its destination, L2 forwarding module 66A passes the packet to link aggregator 68A and directs link aggregator 68A to forward the packet on aggregated interface $AI_1$. In accordance with the principles of the invention, link aggregator 68A determines that $FNH_2$ is a reference to a remote chassis (having chassis ID=C2). The link aggregator 68A further determines that $FNH_1$ references an interface card on member chassis 20 (having chassis ID=C1) that includes PFE 30A. Link aggregator 68A implements a layer 2 forwarding preference by sending the packet to the chassis-local interface (i.e., C1::LC1::IFC8). In some embodiments, link aggregator 68A removes $FNH_2$ (the remote interface) from CAM 70A. In this manner, PFE 30A reduces the amount of data traffic on the inter-chassis links of multi-chassis router 10 as compared to convention link aggregation techniques.

In some embodiments, there may be multiple forwarding next hops on multiple member chassis of multi-chassis router 10. In these instances, link aggregator 68A may implement the layer 2 forwarding preference by sending packets to the shortest path forwarding next hop.

In some embodiments, the forwarding next hop entries in CAM 70A may contain forwarding next hop information in a different format. For example, the interface cards of multi-chassis router 10 may be indexed as described above with respect to FIB entries. Link aggregator 68A in this instance may calculate the chassis ID corresponding to the referenced interface card based on the index number for the interface card in a CAM 70A entry.

Figure 4:
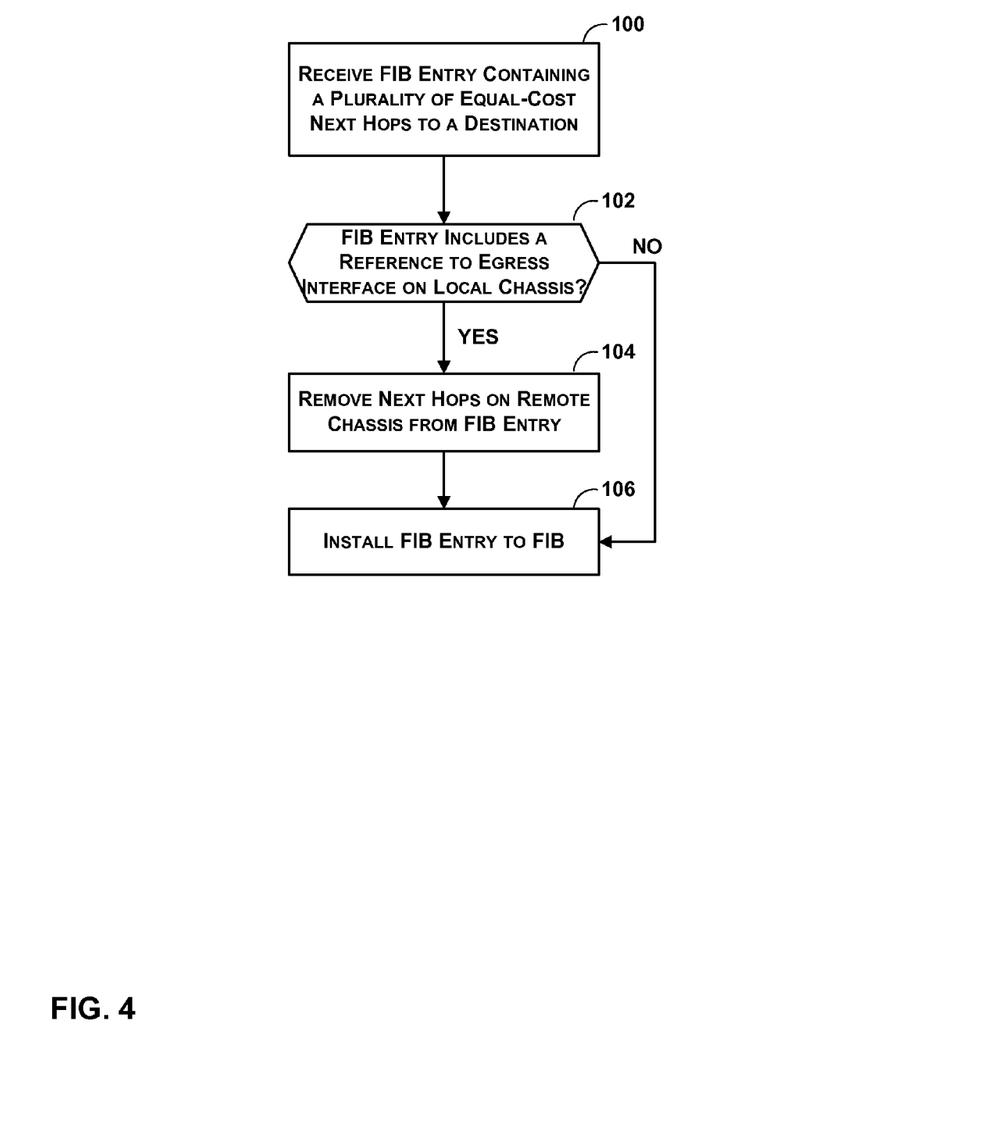
FIG. 4 is a flowchart illustrating an exemplary operation of a packet forwarding engine that implements the chassis-local forwarding preference for equal-cost multi-path described in this disclosure.

FIG. 4 is a flowchart illustrating an exemplary operation of a PFE 30A in the multi-chassis router 10 of FIG. 2 that implements the chassis-local forwarding preference for equal-cost multi-path described in this disclosure.

PFE 30A receives an FIB entry from routing engine 26 that has, in accordance with ECMP techniques, a plurality of next hop interface identifiers that specify equal-cost next hops to a particular network destination (100). The PFE 30A has the chassis ID for member chassis 20A, which is the local chassis for PFE 30A. Based on the chassis ID and information included in the plurality of next hop interface identifiers, the PFE 30A determines whether any of the egress interfaces (also referred to as next hop interfaces) are present on member chassis 20A (102). If the FIB entry includes a next hop interface on member chassis 20A (YES branch of 102), PFE 30A determines whether any of the egress interfaces in the FIB entry are on member chassis 20B and removes them (104). PFE 30A then installs the modified FIB entry in the PFE 30A FIB (106). If there are no local egress interfaces in the FIB entry (NO branch of 102), PFE 30A installs the received FIB entry in the PFE 30A FIB (106).

As described above, in some embodiments, PFE 30A may implement a preference for a shortest-path inter-chassis route to an egress interface rather than merely a chassis-local egress interface. PFE 30A may also perform alternative steps, in lieu of removing a reference to a next hop interface from the FIB entry, such as, for instance, marking or masking the remote entry.

Figure 5:
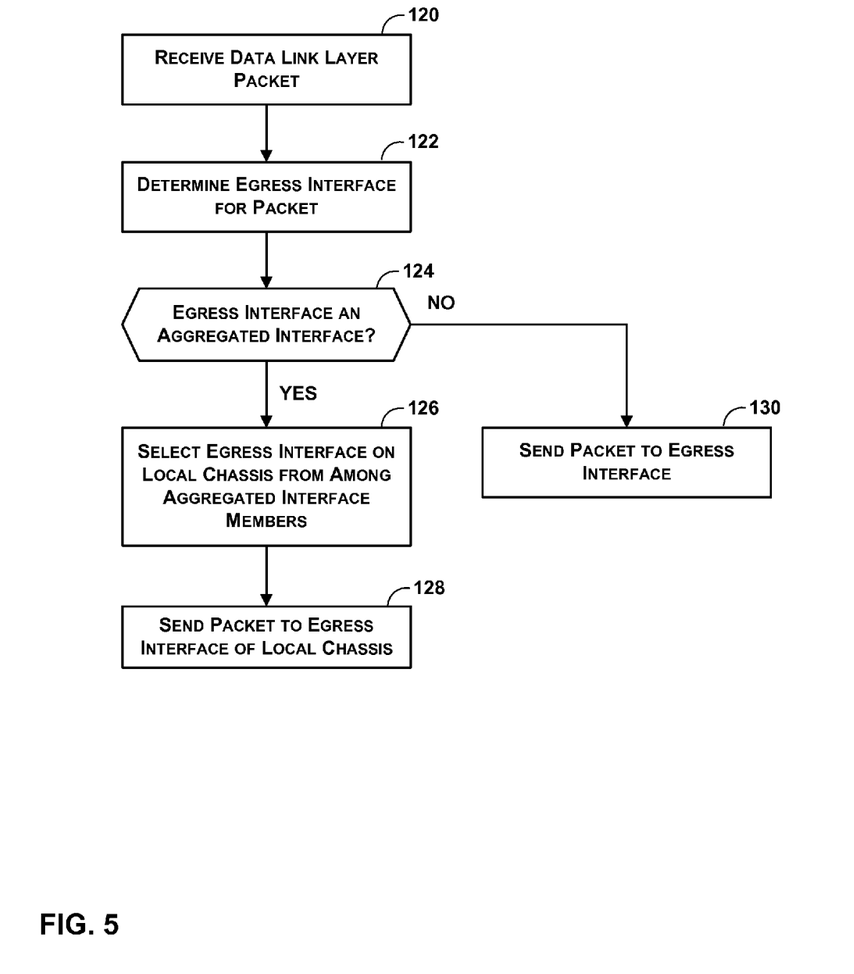
FIG. 5 is a flow chart illustrating an example mode of operation for a packet forwarding engine that implements the chassis-local forwarding preference for link aggregation described in this disclosure.

FIG. 5 is a flow chart illustrating an example mode of operation for a PFE 30A in the multi-chassis router 10 of FIG. 2 that implements the chassis-local forwarding preference for link aggregation described in this disclosure.

PFE 30A has a table of egress interfaces that specify the one of IFCs 32A that maps to particular destinations. PFE 30A receives a data link layer packet from one of IFCs 32A on member chassis 20A (120). PFE 30A looks up the destination address (e.g., the destination MAC address) in the table of egress interfaces (122), and PFE 30A then determines if the specified interface is an aggregated interface constructed in accordance with the Link Aggregation Control Protocol (LACP) (124). If the specified next hop is not an aggregated interface, PFE 30A sends the packet to the specified next hop interface (NO branch of 124). Otherwise, PFE 30A selects the member next hops of the specified aggregate interface, if any, that is present on member chassis 20A based on the chassis ID and the next hop interface identifiers (126). PFE 30A then forwards the packet to the chassis-local next hop interface (128).

As described above, in some embodiments, none of the egress interfaces for multi-chassis router 10 that are members of an aggregated interface and map to a particular destination are present on member chassis 20A. In such instances, PFE 30A may select an appropriate egress interface on a remote chassis based on a shortest-path algorithm.

Various embodiments of the invention have been described. These and other embodiments are within the scope of the following claims.

The invention claimed is:

1. A router comprising:
a plurality of routing chassis operating as a single node within a network, wherein a first routing chassis and a second routing chassis of the router each include an egress interface to a network destination;
an inter-chassis link connecting the first routing chassis and the second routing chassis; and
a forwarding plane of the first routing chassis that receives a forwarding structure that associates the egress interface of the first routing chassis and the egress interface of the second routing chassis with the network destination,
wherein the forwarding plane modifies the forwarding structure to select the egress interface of the first routing chassis to implement a forwarding path preference to reduce utilization of the inter-chassis link by network packets destined for the network destination.

2. The router of claim 1,
wherein the forwarding structure comprises a layer 2 forwarding structure,
wherein the egress interface of the first routing chassis is a layer 2 interface, and
wherein the egress interface of the second routing chassis is a layer 2 interface.

3. The router of claim 2,
wherein the forwarding structure comprises a link aggregation group,
wherein the forwarding plane removes the egress interface of the second routing chassis from the link aggregation group to modify the forwarding structure.

4. The router of claim 1, wherein a control unit of a master routing chassis of the plurality of routing chassis generates or is configured with the forwarding structure and sends the forwarding structure to the forwarding plane.

5. The router of claim 1, wherein the forwarding plane of the first routing chassis receives layer 2 packets destined for a layer 2 address of the network destination and forwards the layer 2 packets by the egress interface of the first routing chassis in accordance with the modified forwarding structure.

6. The router of claim 1, further comprising:
a routing protocol process executing on a control unit of a master routing chassis of the plurality of routing chassis to execute a routing protocol to receive routing information from the network, wherein the routing protocol process generates the forwarding structure based on the routing information and sends the forwarding structure to the forwarding plane.

7. The router of claim 6,
wherein the routing protocol process processes the routing information to identify a first path and a second path to the network destination, wherein the first path and the second bath have equal cost,
wherein the egress interface of the first routing chassis comprises an egress interface for the first path, and
wherein the egress interface of the second routing chassis comprises an egress interface for the second path.

8. The router of claim 1, further comprising:
a forwarding information base of the forwarding plane that stores a link aggregation group,
wherein the forwarding plane, upon modifying the forwarding structure to select the egress interface of the first routing chassis, removes a reference to the egress interface of the second routing chassis from the link aggregation group.

9. The router of claim 1, wherein the forwarding plane determines the egress interface of the first routing chassis is logically located on the first routing chassis and the egress interface of the second routing chassis is not logically located on the first routing chassis.

10. A method comprising:
receiving a forwarding structure with a forwarding plane of a first routing chassis of a multi-chassis router, wherein the router comprises a plurality of routing chassis operating as a single node within a network, wherein the first routing chassis and a second routing chassis of the router each include an egress interface to a network destination and are connected by an inter-chassis link, and wherein the forwarding structure associates the egress interface of the first routing chassis and the egress interface of the second routing chassis with the network destination;
modifying, with the forwarding plane, the forwarding structure to select the egress interface of the first routing chassis to implement a forwarding path preference to reduce utilization of the inter-chassis link by network packets destined for the network destination.

11. The method of claim 10,
wherein the forwarding structure comprises a layer 2 forwarding structure,
wherein the egress interface of the first routing chassis is a layer 2 interface, and
wherein the egress interface of the second routing chassis is a layer 2 interface.

12. The method of claim 11,
wherein the forwarding structure comprises a link aggregation group,
wherein the forwarding plane removes the egress interface of the second routing chassis from the link aggregation group to modify the forwarding structure.

13. The method of claim 10, further comprising:
generating or receiving, with a control unit of a master routing chassis of the plurality of routing chassis, the forwarding structure; and
sending the forwarding structure from the control unit to the forwarding plane.

14. The method of claim 10, further comprising:
receiving layer 2 packets destined for a layer 2 address of the network destination; and
forwarding the layer 2 packets by the egress interface of the first routing chassis in accordance with the modified forwarding structure.

15. The method of claim 10, further comprising:
executing a routing protocol process with a control unit of a master routing chassis of the plurality of routing chassis to execute a routing protocol;
receiving routing information from the network with the routing protocol process in accordance with the routing protocol;
generating, with the routing protocol process, the forwarding structure based on the routing information; and
sending the forwarding structure from the control unit to the forwarding plane.

16. The method of claim 15, further comprising:
processing, with the routing protocol process, the routing information to identify a first path and a second path to the network destination, wherein the first path and the second bath have equal cost,
wherein the egress interface of the first routing chassis comprises an egress interface for the first path, and
wherein the egress interface of the second routing chassis comprises an egress interface for the second path.

17. The method of claim 10, further comprising:
removing a reference to the egress interface of the second routing chassis from a link aggregation group stored in a forwarding information base of the forwarding plane.

18. The method of claim 10, further comprising:
determining, with the forwarding plane, the egress interface of the first routing chassis is logically located on the first routing chassis and the egress interface of the second routing chassis is not logically located on the first routing chassis.

19. The method of claim 10, wherein modifying the forwarding structure comprises adding configuration data to the forwarding structure that specifies that the egress interface of the first routing chassis is a preferred egress interface.

20. A non-transitory computer-readable medium comprising instructions for causing one or more programmable processors to:
receive a forwarding structure with a forwarding plane of a first routing chassis of a multi-chassis router, wherein the router comprises a plurality of routing chassis operating as a single node within a network, wherein the first routing chassis and a second routing chassis of the router each include an egress interface to a network destination and are connected by an inter-chassis link, and wherein the forwarding structure associates the egress interface of the first routing chassis and the egress interface of the second routing chassis with the network destination;
modify, with the forwarding plane, the forwarding structure to select the egress interface of the first routing chassis to implement a forwarding path preference to reduce utilization of the inter-chassis link by network packets destined for the network destination.

* * * * *